C. M. F. A. TARDIEU AND G. PEREIRE.
SHOCK ABSORBING WHEEL.
APPLICATION FILED JUNE 29, 1918.
1,321,406.
Patented Nov. 11, 1919.
2 SHEETS—SHEET 1.
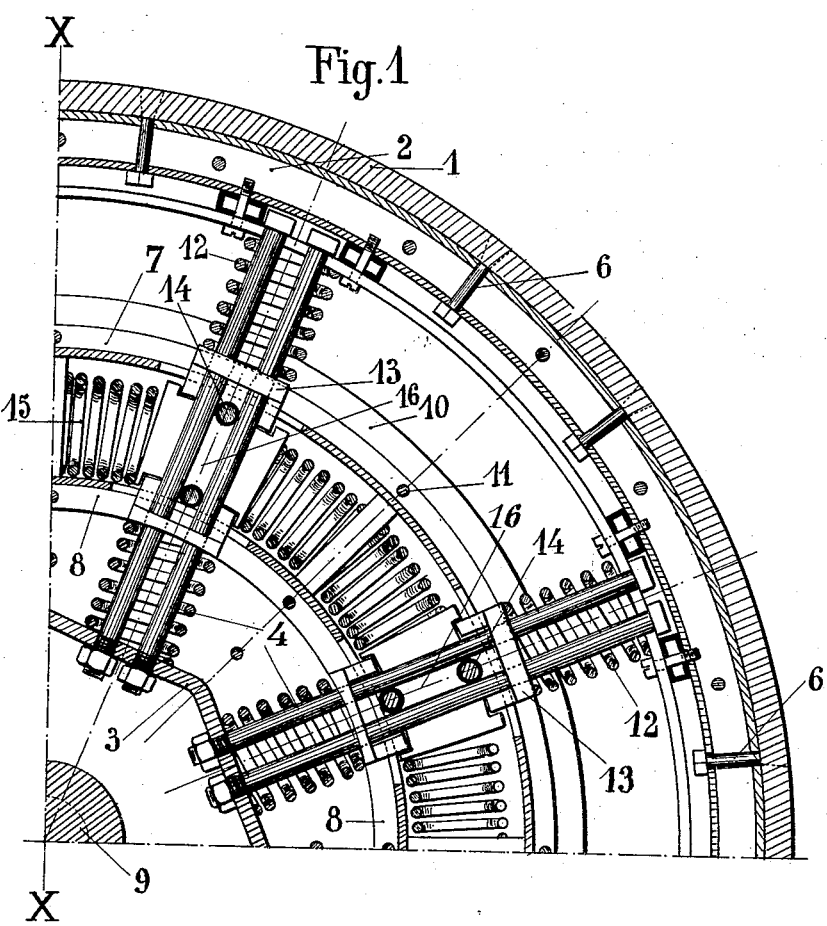

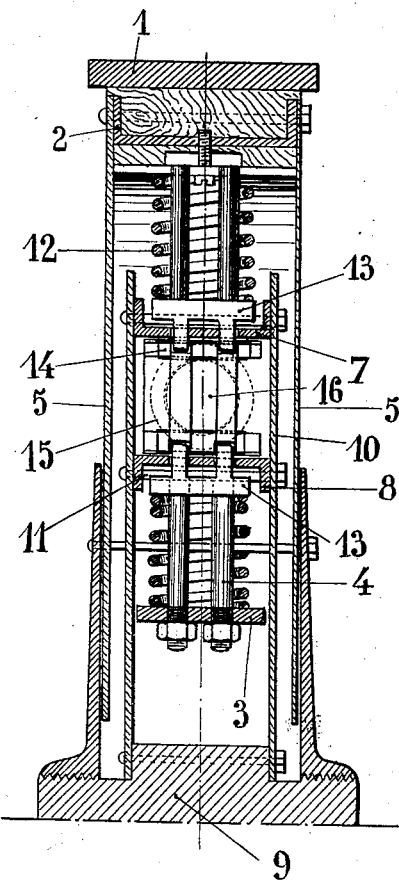

UNITED STATES PATENT OFFICE.

CHARLES MARIE FELIX AMÉDÉE TARDIEU AND GUSTAVE PEREIRE, OF PARIS, FRANCE.

SHOCK-ABSORBING WHEEL.

1,321,406.  Specification of Letters Patent.  Patented Nov. 11, 1919.

Application filed June 29, 1918. Serial No. 242,682.

*To all whom it may concern:*

Be it known that we, CHARLES MARIE FELIX AMÉDÉE TARDIEU and GUSTAVE PEREIRE, citizens of the Republic of France, and residents of Paris, France, have invented a new and useful Improvement in Shock-Absorbing Wheels, which invention is fully set forth in the following specification.

This invention has for its object a shock absorbing wheel; this wheel is characterized by the combination of two concentric wheels one within the other, of two series of springs and a special sliding quadrilateral piece.

This wheel which absorbs shocks by reason of its combined action of springs and which is dust proof to a great extent, is illustrated in the accompanying drawings in which Figure 1 is a section showing a quarter of the wheel and Fig. 2 is a vertical section on the line X—X of Fig. 1.

The outer wheel is made up of a tread member 1, felly 2, and inner rim 3, connected together by spokes 4 and a casing plate 5. The tread member 1 is independent of the felly 2 to which it is fixed as shown by means of bolts 6.

The inner wheel comprises annular rings 7 and 8 connected together and to the hub 9 of the wheel by plates 10 and bolts 11. The hub 9 owing to the modifications of its central portion may be rendered interchangeable and applied to axles of different sizes. The springs whether radial or circumferential are placed in position by compressing them by means of a special tool. The radial springs 12 are arranged between the outer and inner wheels. They rest both against the felly 2 and inner rim 3 and against the circumferential faces of quadrilateral abutments which consist of a main abutment member 16 on the lateral faces of which press the circumferential springs 15 and separate spring seats 13 on which press the radial springs 12. These abutments are provided with openings which permit sliding movement on the spokes. The spokes 4 pass through the springs 12 and form a guide. The cylinders or rollers 14 allow the quadrilateral seat 13 to slide across the annular rings 7 and 8 of the inner wheel. They facilitate the freedom of the annular rings as regards the radial springs 12 and the circumferential springs 15. The circumferential springs 15 are arranged between the annular rings 7 and 8 of the inner wheel. They rest upon the faces of the quadrilateral sliding seat 13. Just as the springs 12 follow the movements of the felly 2 and inner rim 3 so the circumferential springs follow the movements of the annular rings 7 and 8. Each wheel sector comprises two radial springs and two circumferentially extending springs corresponding to one sliding quadrilateral piece which with its four faces, two being circumferential and two radial, forms the essential member of the shock absorbing wheel; it establishes coöperative action between the movements in the roll between the outer and inner wheels, between the two forces which act upon it, the weight and the acquired speed.

Lubricant is placed at 16 for lubricating the quadrilateral piece, the rollers and the spokes 4.

The action of the wheel is easy to understand on studying the construction and the play of the various parts.

The inner wheel through its hub 9 supports the weight of the vehicle. The quite rigid outer wheel alone touches the ground. Consequently the inner wheel is suspended in the frame of the outer wheel. This suspension is due to the assemblage of the radial and circumferential springs. The center of the inner wheel and the inner wheel as a whole moves downward more or less into the frame of the outer wheel. A very small flection of the springs is only therefore necessary to absorb shock, but this flection should be constant, for if one of the springs were not to act the two wheels would form a single rigid wheel. The radial and circumferential springs form the complement of each other and in rolling coöperate in the same object, that is to say, to isolate from the ground the two forces, weight and acquired speed, which always act according to gravity.

In order to prevent damage to the inner wheel which is protected by the outer wheel an apparatus should be provided to allow the easy removal of faulty springs and their replacement with new springs.

The wheel illustrated is shown only by way of illustrating a shock absorbing apparatus which based upon the process may be applied to all sorts of mechanical parts for transmitting force for preventing shock and protecting the delicate elements which may be injured.

Claim—

In a shock absorbing wheel, the combination of an outer wheel comprising concentric ring members and groups of spokes securing said members together, spring abutment members slidable on said spokes, helical springs surrounding said spoke groups and yieldingly holding said abutment against movement, an inner wheel comprising a hub and a tubular ring member having openings through which said abutments play, and springs therein abutting the lateral sides of said abutments for resisting the roll between said inner and outer wheels.

In testimony whereof we have signed this specification.

CHARLES MARIE FELIX AMÉDÉE TARDIEU.
GUSTAVE PEREIRE.

Witnesses:
GASTON DE MESTRAL,
CHAS. P. PRESSLY.